United States Patent
Roy et al.

(10) Patent No.: US 7,613,223 B2
(45) Date of Patent: Nov. 3, 2009

(54) TIME-FREQUENCY CODING IN A MULTI-BAND ULTRA-WIDEBAND SYSTEM

(75) Inventors: Sumit Roy, Bothell, WA (US); Jeffrey R. Foerster, Portland, OR (US); V. Srinivasa Somayazulu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 828 days.

(21) Appl. No.: 10/749,343

(22) Filed: Dec. 31, 2003

(65) Prior Publication Data

US 2005/0018751 A1 Jan. 27, 2005

Related U.S. Application Data

(60) Provisional application No. 60/451,052, filed on Feb. 28, 2003.

(51) Int. Cl.
*H04B 1/69* (2006.01)
*H04B 1/707* (2006.01)
*H04B 1/713* (2006.01)

(52) U.S. Cl. .................. 375/133; 375/135; 375/136; 375/132

(58) Field of Classification Search .................. 375/132, 375/133, 135, 136, 130
See application file for complete search history.

(56) References Cited

U.S. PATENT DOCUMENTS

| 5,822,362 | A  | * | 10/1998 | Friedmann | 375/130 |
| 6,704,346 | B1 | * | 3/2004  | Mansfield | 375/136 |
| 7,177,341 | B2 | * | 2/2007  | McCorkle  | 375/130 |
| 7,215,698 | B2 | * | 5/2007  | Darby et al. | 375/135 |
| 7,280,580 | B1 | * | 10/2007 | Haartsen  | 375/138 |

* cited by examiner

Primary Examiner—Phuong Phu
(74) Attorney, Agent, or Firm—David L. Guglielmi

(57) ABSTRACT

Time-frequency coding in a multi-band ultra-wideband system is generally described. In this regard a hopping code agent is presented to select a frequency hopping code for encoding and decoding from a set of predetermined FHC's for communicating with other devices in a multi-band ultra-wideband (MB-UWB) network, wherein the FHC defines a sequence of two or more pulses over two or more frequencies and wherein the FHC's include a time slot that contains no transmission. Other embodiments are also disclosed and claimed.

8 Claims, 4 Drawing Sheets

TIME-FREQUENCY CODING IN A MULTI-BAND ULTRA-WIDEBAND SYSTEM

RELATED APPLICATION

This patent application claims priority to provisional U.S. patent application No. 60/451,052 filed Feb. 28, 2003 and entitled "UWB Transceiver Architecture and Associated Methods," assigned to the assignee of the present invention and herein incorporated by reference.

TECHNICAL FIELD

Embodiments of the invention generally relate to wireless communication systems and, more particularly, to time-frequency coding in a multi-band ultra-wideband system.

BACKGROUND

Ultra-wideband (UWB) signals, according to one commonly held definition, are exemplified by a signal spectrum wherein the bandwidth divided by the center frequency is roughly 0.25. The use of ultra-wideband (UWB) signals for wireless communication, in its most basic form, has been around since the beginning of wireless communications. However, today's wireless communication environment poses many challenges to the design of ultra-wideband communication systems including, for example, the lack of a worldwide standard for ultra-wideband communications, the potential interference with narrowband wireless systems, interference with other ultra-wideband applications (e.g., RADAR, etc.), and the list goes on. Those skilled in the art will appreciate that the sheer number of such design challenges has heretofore dampened research efforts and, as such, deployment of such ultra-wideband communication solutions.

BRIEF DESCRIPTION OF THE DRAWINGS

Embodiments of the present invention is illustrated by way of example, and not by way of limitation, in the figures of the accompanying drawings in which like reference numerals refer to similar elements and in which.

DETAILED DESCRIPTION

Embodiments of the invention are generally directed to time-frequency coding in a multi-band ultra-wideband system, although the invention is not limited in this regard. According to one aspect of the invention, to be described more fully below, a hopping code agent and associated methods to establish a piconet using frequency hopping codes are presented.

Reference throughout this specification to "one embodiment" or "an embodiment" means that a particular feature, structure or characteristic described in connection with the embodiment is included in at least one embodiment of the present invention. Thus, appearances of the phrase "in one embodiment" or "in an embodiment" in various places throughout this specification are not necessarily all referring to the same embodiment. Furthermore, the particular features, structures or characteristics may be combined in any suitable manner in one or more embodiments.

Figure 1:
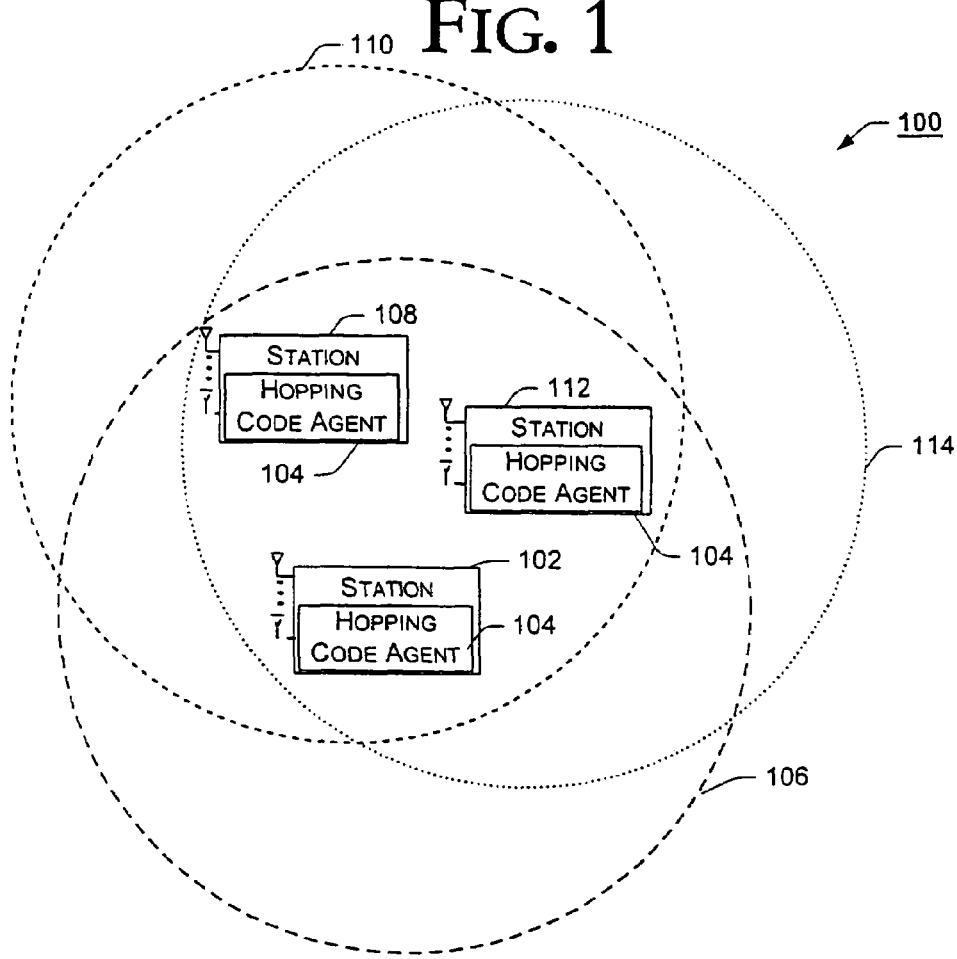
FIG. 1 is a block diagram of an example network environment suitable for implementing the hopping code agent, according to one example embodiment of the present invention.

FIG. 1 is a block diagram of an example network environment suitable for implementing the hoping code agent, according to one example embodiment of the invention. In accordance with the illustrated example embodiment, network environment 100 may include one or more of a stations 102, 108 and 112, hopping code agent 104, and network areas 106, 110 and 114 coupled as shown in FIG. 1. Hopping code agent 104, as described more fully hereinafter, may well be used in electronic appliances and network environments of greater or lesser complexity than that depicted in FIG. 1. Also, the innovative attributes of hopping code agent 104 as described more fully hereinafter may well be embodied in any combination of hardware and software.

Stations 102, 108 and 112 may represent laptop, desktop, or handheld computing devices or any other computing devices or appliances that can access network resources through a wireless network and that host hopping code agent 104. As used herein, a wireless network generally represents any network wherein communications do not require the use of wires or cables. Examples of wireless networks include, but are not limited to, wireless local area networks (WLAN), wireless metropolitan area networks (WMAN), wireless wide are networks (WWAN), and wireless personal area networks (WPAN). In one embodiment, the wireless network is a WPAN using ultra wideband (UWB) wireless technology. In one embodiment, though the present invention is not so limited, stations 102, 108 and 112 may represent The Institute of Electrical and Electronics Engineers, Inc. (IEEE) 802.15.3a (amendment to 802.15.3 standard, under development) compliant stations.

Network areas 106, 110 and 114 may represent the maximum signal ranges for stations 102, 108 and 112, respectively. Though depicted as two-dimensional circles for illustration purposes, network areas 106, 110 and 114 may be three-dimensional and may be any shape based on obstructions, terrain, and other factors. In one embodiment, stations 102, 108 and 112 may be located such that each can communicate with the others, thereby creating a piconet with shared channel access.

Hopping code agent 104 may have an architecture as described in greater detail with reference to FIG. 5. Reservation agent 104 may also perform one or more methods for establishing piconets using frequency hopping codes, such as the method described in greater detail with reference to FIG. 6.

Figure 2:
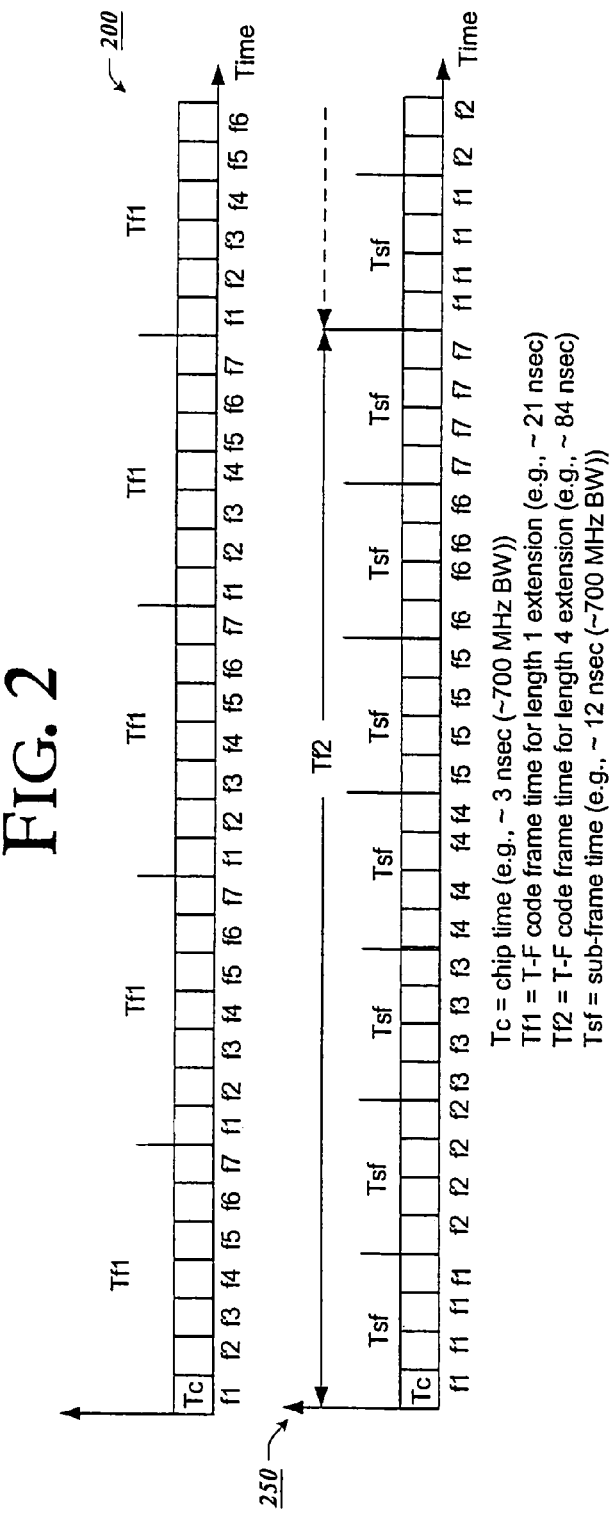
FIG. 2 is a graphical illustration of time-frequency codes applied to symbols for transmission, according to disparate embodiments of the present invention.

Turning briefly to FIG. 2, a graphical illustration of time-frequency (FH) codes applied to symbols within a frame of content for transmission is presented, according to example embodiments of the present invention. With reference to identifier 200, an example embodiment wherein the extension factor applied to the FH code is one (1), i.e., frequency hopping is occurring on an incremental basis, e.g., on a per-chip basis as shown in graph 200. Thus, for each chip (Tc) within a sub-frame (Tf1), a new frequency band (f1, f2, f3 ... f7) is selected for transmission.

In graph 250, however, an example embodiment where an extension factor of four (4) is applied, i.e., frequency hopping is occurring after four (4) sequential chips are transmitted within a frequency band, before hopping to the next frequency band. Thus, four chips are transmitted on f1, then four on f4, and so on, as depicted. In this regard, according to one aspect of the invention, the received content is processed to transmit any number of sequential pulses (M) within at least a subset of any number (N) of narrower frequency bands of the UWB spectrum. These pulses can also be transmitted and received in parallel, as in a multi-carrier CDMA or OFDM system.

As shown in FIG. 2, the frequencies selected appear in numerical order (i.e. f1, then f2, and so on), however, it should be appreciated that the frequencies used in a frequency hopping code may occur in any sequence. In one embodiment, a set of nine discrete sequences (or codes) containing eight sub-bands out of nine available sub-bands may be utilized based on Galois Field GF(p) or Extended Galois Field GF($p^m$), although the present invention is not limited to these numbers of sequences, sub-bands contained, or sub-bands available. One skilled in the art would appreciate that utilizing sets of sequences based on the theory of irreducible polynomials over GF($p^m$), where p is prime, and m is an integer, may produce at most one coincidence (potential collision) between any two sequences for any offset. In another embodiment, there may be a time slot(s) in a sequence(s) that contain no transmission in order to create more available sequences based on the number of sub-bands available and/or contained in the sequences.

Figure 3:
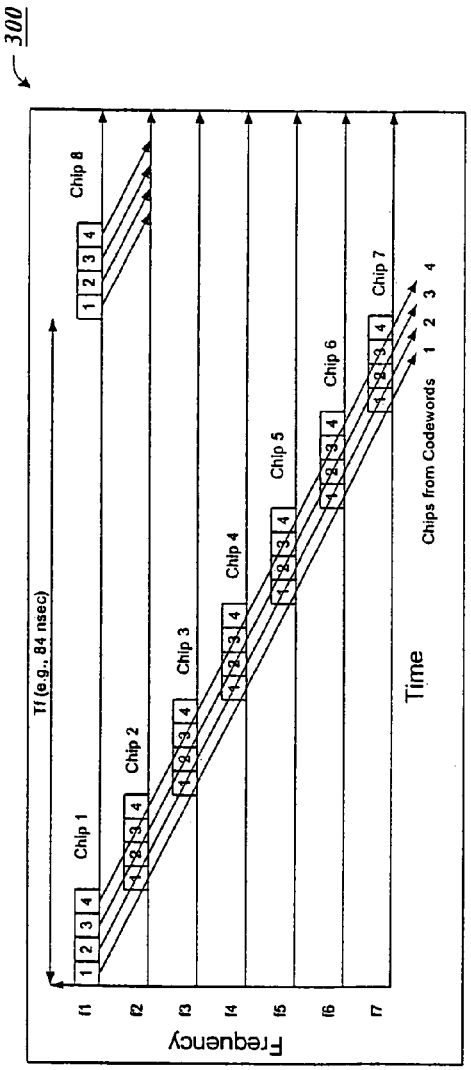
FIG. 3 is a time frequency graph depicting the use of extended time frequency codes, according to one embodiment of the present invention.

FIG. 3 is a time-frequency graph depicting the use of extended time frequency codes, according to one aspect of the invention. In accordance with the illustrated example embodiment of FIG. 3, graph 300 depicts a number of chips being transmit within a first narrower frequency band (f1) of the UWB spectrum before hopping to the next narrower frequency band (f2) for transmission. More particularly, graph 300 illustrates the block interleaving of four (4) bi-orthogonal codewords (1 ... 4) with a ⅔ byte interleaving delay (depending on in-phase (I)/quadrature (Q) interleaving strategy). In this regard, the incremental content (chips, symbols, etc.) of a frame (denoted as 1, 2, 3 ... ) is spread across multiple frequency bands and separated in time (e.g., 84 nanoseconds).

Figure 4:
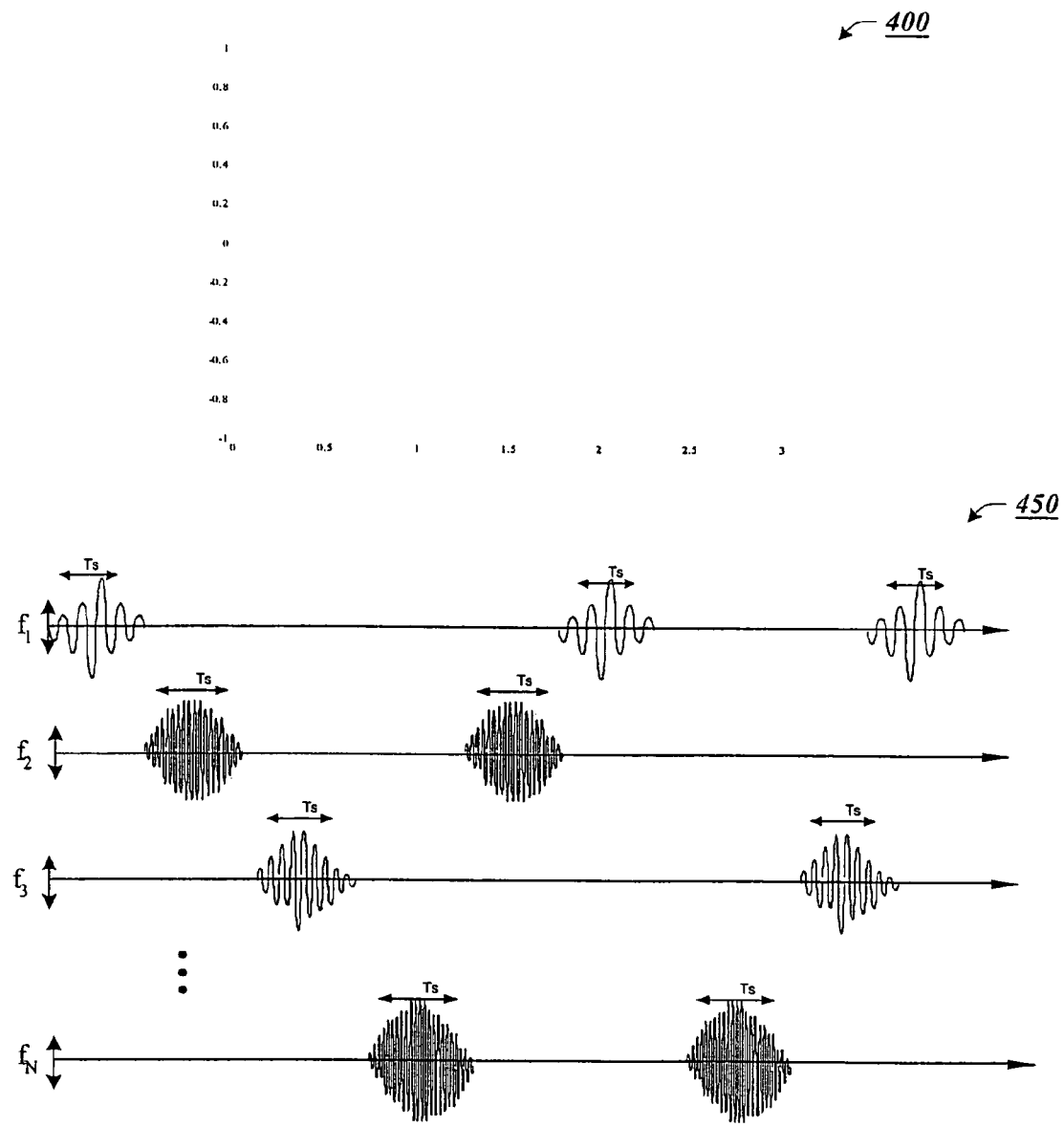
FIG. 4 provides graphical representations of a modulated symbol as well as a time-frequency graph of such modulated symbol(s), according to one embodiment of the invention.

FIG. 4 provides a graphical representation of a modulated frame element (e.g., symbol), as well as a time-frequency graph of such modulated frame element, in accordance with one example embodiment of the invention. In accordance with one example embodiment of the present invention, each symbol is transmitted within the narrower frequency band ($f_1$, $f_2$ ... $f_N$) using a rectified cosine waveform 400, although the invention is not limited in this respect. According to one example implementation, a three (3) nanosecond pulse with a rectified cosine shape is generated with a 700 MHz bandwidth, and 550 MHz channel separation. According to one example implementation, to reduce the effect of interference (e.g., narrowband interference) and/or channel overlap, a frequency separation offset of 275 MHz may be selectively applied. The transmission of symbols using a FH codes is presented with reference to graph 450.

Figure 5:
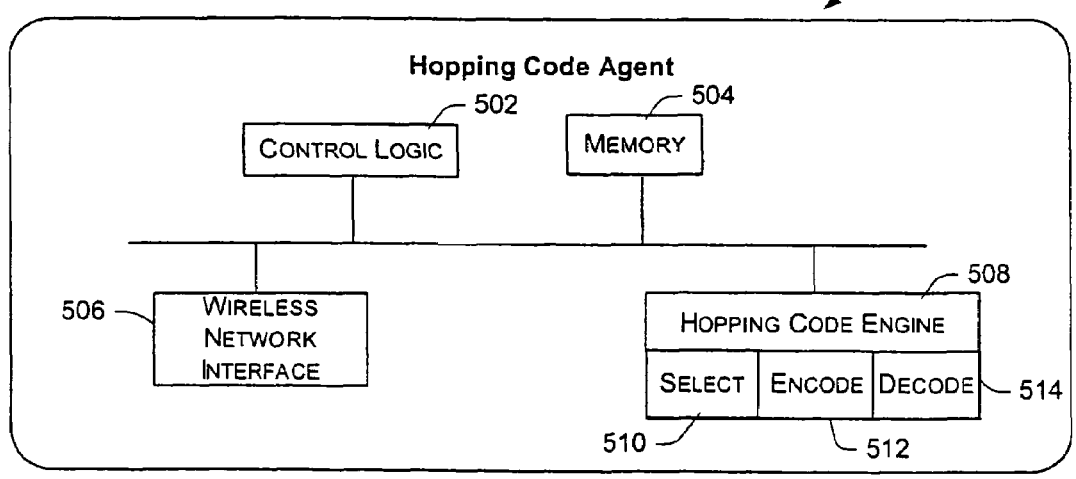
FIG. 5 is a block diagram of an example hopping code agent architecture, according to one example embodiment of the present invention.

FIG. 5 is a block diagram of an example hopping code agent architecture, according to one example embodiment of the invention. As shown, hopping code agent 104 may include one or more of control logic 502, memory 504, wireless network interface 506, and hopping code engine 508 coupled as shown in FIG. 5. In accordance with one aspect of the present invention, to be developed more fully below, hopping code agent 104 may include a hopping code engine 508 comprising one or more of select services 510, encode services 512, and/or decode services 514. It is to be appreciated that, although depicted as a number of disparate functional blocks, one or more of elements 502-514 may well be combined into one or more multi-functional blocks. Similarly, hopping code engine 508 may well be practiced with fewer functional blocks, i.e., with only encode services 512, without deviating from the spirit and scope of the present invention, and may well be implemented in hardware, software, firmware, or any combination thereof. In this regard, hopping code agent 104 in general, and hopping code engine 508 in particular, are merely illustrative of one example implementation of one aspect of the present invention. As used herein, hopping code agent 104 may well be embodied in hardware, software, firmware and/or any combination thereof.

As introduced above, hopping code agent 104 may have the ability to establish a piconet using frequency hopping codes. In one embodiment, an access point establishes a frequency hopping code with hopping code agent 104 to be used in communications with stations attempting to associate with the access point. In another embodiment, hopping code agent 104 may allow a station attempting to locate and associate with another station (i.e., an access point) to determine the established frequency hopping code. One skilled in the art would appreciate that hopping code agent 104 can provide for efficient use of bandwidth by minimizing collisions with communications of the piconet.

As used herein control logic 502 provides the logical interface between hopping code agent 104 and its host station (for example 102). In this regard, control logic 502 may manage one or more aspects of hopping code agent 104 to provide a communication interface from station 102 to wireless network communications, e.g., through wireless interface 506 and one or more antenna(e).

According to one aspect of the present invention, though the claims are not so limited, control logic 502 may receive event indications such as, e.g., receipt from the host station of a communication to be transmitted. Upon receiving such an indication, control logic 502 may selectively invoke the resource(s) of hopping code engine 508. As part of an example method for establishing piconets using frequency hopping codes, as explained in greater detail with reference to FIG. 6, control logic 502 may selectively invoke select services 510 that may a frequency hopping code to be utilized as part of a piconet. Control logic 502 also may selectively invoke encode services 512 or decode services 514, as explained in greater detail with reference to FIG. 6, to encode communication(s) to transmit or decode communication(s) received, respectively. As used herein, control, logic 502 is intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In some implementations, control logic 502 is intended to represent content (e.g., software instructions, etc.), which when executed implements the features of control logic 502 described herein.

Memory 504 is intended to represent any of a wide variety of memory devices and/or systems known in the art. According to one example implementation, though the claims are not so limited, memory 504 may well include volatile and non-volatile memory elements, possibly random access memory (RAM) and/or read only memory (ROM). Memory 504 may be used to store communication(s) to be encoded/decoded and/or a frequency hopping code(s) to be used for encoding/decoding.

Wireless network interface 506 provides a path through which hopping code agent 104 can communicate with other network devices, for example among stations 102, 108 and 112. Wireless network interface 506 is intended to represent any of a wide variety of network interfaces and/or controllers known in the art. In one embodiment, wireless network interface includes a transmitter and receiver as described in U.S. patent application Ser. No. 10/379,395 filed Mar. 3, 2003 and entitled "AN ULTRA-WIDEBAND TRANSCEIVER ARCHITECTURE AND ASSOCIATED METHODS," assigned to the assignee of the present invention and herein incorporated by reference.

As introduced above, hopping code engine 508 may be selectively invoked by control logic 502 to select a frequency hopping code, to encode communication(s) to be transmitted with the frequency hopping code, or to decode communication(s) received with the frequency hopping code. In accordance with the illustrated example implementation of FIG. 5, hopping code engine 508 is depicted comprising one or more of select services 510, encode services 512 and decode services 514. Although depicted as a number of disparate elements, those skilled in the art will appreciate that one or more elements 510-514 of hopping code engine 508 may well be combined without deviating from the scope and spirit of the present invention.

Select services 510, as introduced above, may provide hopping code agent 104 with the ability to select a frequency hopping code. In one example embodiment, select services 510 may select a frequency hopping code by attempting to decode communication(s) using one of a plurality of frequency hopping codes. If a beacon signal is decoded, then select services 510 may select the frequency hopping code used to decode the beacon signal. If a beacon signal is not decoded, select services 510 may attempt decoding using a different frequency hopping code until a beacon signal is decoded. In another example embodiment, select services 510 may scan available frequencies for activity, and then selects a frequency hopping code that may avoid the most likely sources of interference (for example, the most active frequencies). In another example embodiment, select services 510 may employ a method described in the aforementioned patent application entitled "AN ULTRA-WIDEBAND TRANSCEIVER ARCHITECTURE AND ASSOCIATED METHODS," assigned to the assignee of the present invention and herein incorporated by reference.

As introduced above, encode services 512 may provide hopping code agent 104 with the ability to encode communication(s) to be transmitted using the selected frequency hopping code. In one example embodiment, encode services 512 may employ a method described in the aforementioned patent application entitled "AN ULTRA-WIDEBAND TRANSCEIVER ARCHITECTURE AND ASSOCIATED METHODS," assigned to the assignee of the present invention and herein incorporated by reference.

Decode services 514, as introduced above, may provide hopping code agent 104 with the ability to decode communication(s) received using the selected frequency hopping code. In one embodiment, decode services 514 may employ a method described in the aforementioned patent application entitled "AN ULTRA-WIDEBAND TRANSCEIVER ARCHITECTURE AND ASSOCIATED METHODS," assigned to the assignee of the present invention and herein incorporated by reference.

Figure 6:
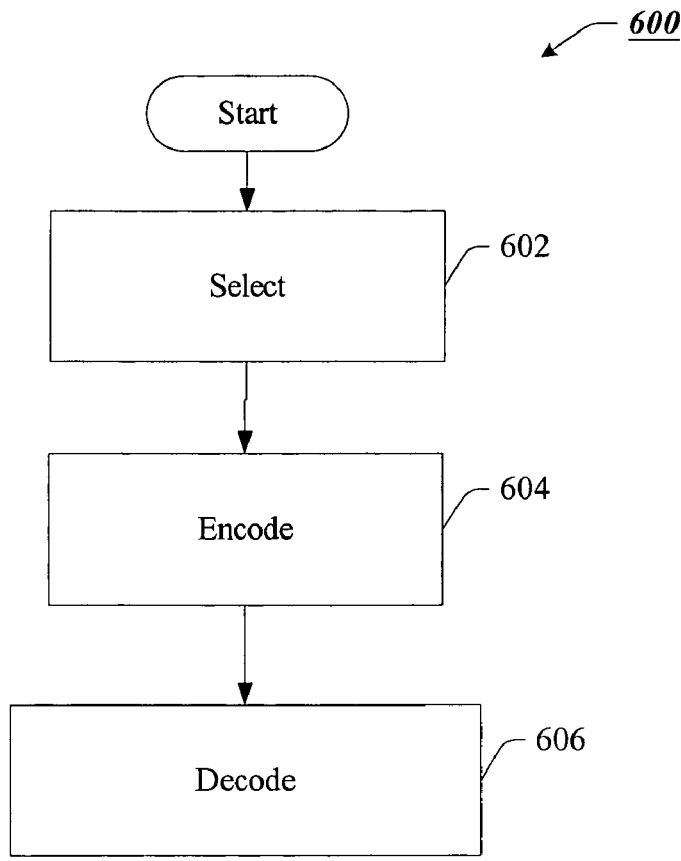
FIG. 6 is a flow chart of an example method for establishing piconets using frequency hopping codes, according to one example embodiment of the invention.

Turning next to FIG. 6, a network control function performed by hopping code agent 104 introduced above will be described. More particularly, in accordance with another aspect of an embodiment of the invention, FIG. 6 illustrates a flow chart of an example method for establishing piconets using frequency hopping codes, according to one example embodiment of the invention. It will be readily apparent to those of ordinary skill in the art that although the following operations may be described as a sequential process, many of the operations may in fact be performed in parallel or concurrently. In addition, the order of the operations may be re-arranged without departing from the spirit of embodiments of the invention.

According to but one example implementation, the method of FIG. 6 begins with control logic 502 invoking select services 510 to select (602) a frequency hopping code. In one example embodiment, select services 510 of station 102 may select a frequency hopping code that may minimize interference with other active frequencies and use the selected frequency hopping code to encode and transmit a beacon signal through wireless network interface 506 to stations 108 and 112. In one example embodiment, stations 108 and 112 determine the frequency hopping code to be used in the piconet by determining which frequency hopping code from a set of frequency hopping codes decodes the beacon signal from station 102.

Next, encode services 512 may be invoked to encode (604) communication(s). In one example embodiment, transmit services 512 of station 102 may broadcast (and rebroadcast if necessary) frames to station 108 and/or station 112 that are encoded using the selected frequency hopping code.

Control logic 502 may then decode (606) the communication(s) by invoking decode services 514. In one example embodiment, station 108 and/or station 112 decode (using the selected frequency hopping code) encoded frames that were broadcast by station 102.

It will be appreciated by those skilled in the art that the foregoing was but a mere illustration of the teachings of the present invention, as other embodiments and implementations are anticipated within the scope of the invention. Examples of such alternate embodiments are briefly described below.

Figure 7:
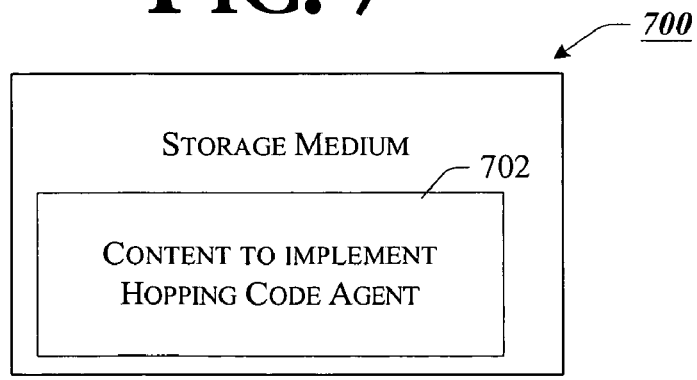
FIG. 7 is a block diagram of a storage medium comprising content which, when executed by an accessing communications device, causes the communication device to implement at least one aspect of an embodiment of the invention, according to one embodiment of the invention.

FIG. 7 is a block diagram of an example storage medium comprising content which, when executed by an accessing appliance, may cause the appliance to implement one or more aspects of an embodiment of the invention. In this regard, storage medium 700 includes content 702 to implement one or more aspects of hopping code agent 104, described above.

As used herein, the machine-readable medium 700 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a wired/wireless modem or network connection).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, or may be embodied in machine-executable content (e.g., instructions), which may be used to cause a general-purpose or special-purpose processor or logic circuits programmed with the instructions to perform the steps. Alternatively, the steps may be performed by a combination of hardware and software. Moreover, although the invention has been described in the context of a network device, those skilled in the art will appreciate that such functionality may well be embodied in any of number of alternate embodiments such as, for example, integrated within a computing device (e.g., a server).

Many of the methods are described in their most basic form but steps can be added to or deleted from any of the methods and information can be added or subtracted from any of the described messages without departing from the basic scope of the present invention. Any number of variations of the inventive concept are anticipated within the scope and spirit of the present invention.

In this regard, the particular illustrated example embodiments are not provided to limit the invention but merely to illustrate it. Thus, the scope of the present invention is not to be determined by the specific examples provided above but only by the plain language of the following claims.

What is claimed is:

1. An electronic appliance, comprising:
   one or more dipole antenna(e);
   one or more transceiver(s), coupled with the one or more dipole antenna(e), to communicate with other devices; and
   a hopping code engine to select a frequency hopping code (FHC) from a set of predetermined FHC's for communicating with other devices in a multi-band ultra-wideband (MB-UWB) network, wherein the FHC is selected based on being able to decode a beacon signal, wherein the FHC defines a sequence of two or more pulses over two or more frequencies and wherein the FHC's include a time slot that contains no transmission.

2. The electronic appliance of claim 1, wherein the hopping code engine to select a frequency hopping code (FHC) from a set of predetermined FHC's for communicating with other devices in a multi-band ultra-wideband (MB-UWB) network comprises:
   the hopping code engine to select a frequency hopping code (FHC) from a set of predetermined FHC's for communicating with other devices in an Institute of Electrical and Electronics Engineers (IEEE) 802.15.3 network.

3. The electronic appliance of claim 1, further comprising:
   the hopping code engine to encode a communication to transmit using the selected FHC.

4. The electronic appliance of claim 1, further comprising:
   the hopping code engine to decode a communication received using the selected FHC.

5. An apparatus, comprising:
   one or more dipole antenna(e);
   one or more transceiver(s), coupled with the dipole antenna(e), to communicate with other devices; and
   control logic coupled with the transceiver(s), the control logic to select a frequency hopping code (FHC) from a set of predetermined FHC's for communicating with other devices in a multi-band ultra-wideband (MB-UWB) network, wherein the FHC is selected based on being able to decode a beacon signal, wherein the FHC defines a sequence of two or more pulses over two or more frequencies and wherein the FHC's include a time slot that contains no transmission.

6. The apparatus of claim 5, wherein the control logic to select a frequency hopping code (FHC) from a set of predetermined FHC's for communicating with other devices in a multi-band ultra-wideband (MB-UWB) network comprises:
   control logic to select a frequency hopping code (FHC) from a set of predetermined FHC's for communicating with other devices in an Institute of Electrical and Electronics Engineers (IEEE) 802.15.3 network.

7. The apparatus of claim 5, further comprising:
   control logic to encode a communication to transmit using the selected FHC.

8. The apparatus of claim 5, further comprising:
   control logic to decode a communication received using the selected FHC.

* * * * *

UNITED STATES PATENT AND TRADEMARK OFFICE
CERTIFICATE OF CORRECTION

| | | |
|---|---|---|
| PATENT NO. | : 7,613,223 B2 | Page 1 of 1 |
| APPLICATION NO. | : 10/749343 | |
| DATED | : November 3, 2009 | |
| INVENTOR(S) | : Roy et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1499 days.

Signed and Sealed this

Nineteenth Day of October, 2010

David J. Kappos
*Director of the United States Patent and Trademark Office*